G. P. RUHLE.
Combined Scraper and Fork.
No. 223,390. Patented Jan. 6, 1880.
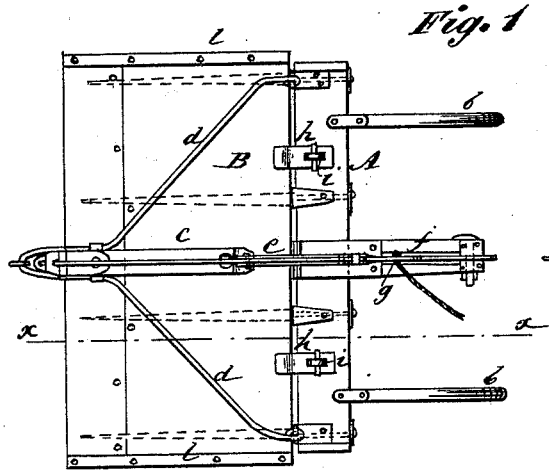
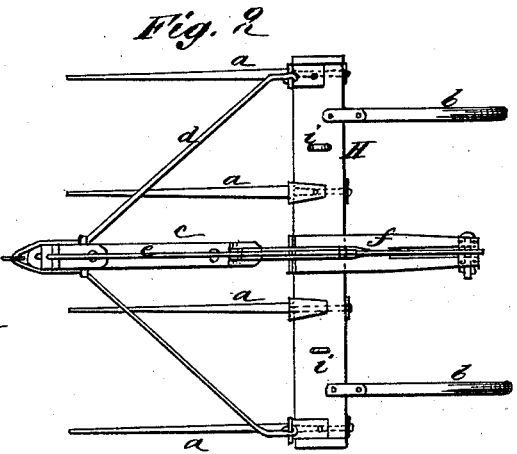
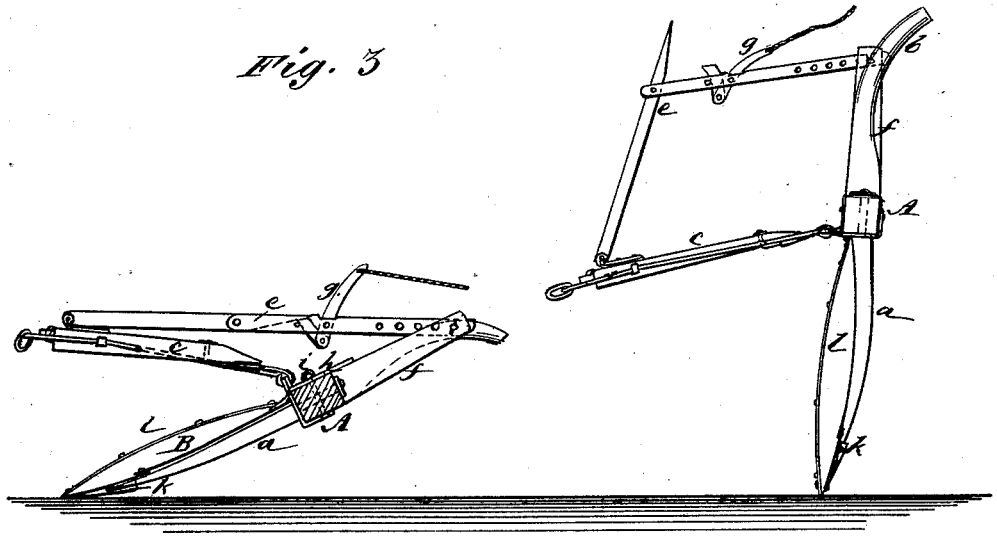
WITNESSES:
C. Neveux
C. Sedgwick
INVENTOR:
G. P. Ruhle
BY Munn & Co
ATTORNEYS.

UNITED STATES PATENT OFFICE.

GEORGE P. RUHLE, OF SWENGEL, PENNSYLVANIA.

COMBINED SCRAPER AND FORK.

SPECIFICATION forming part of Letters Patent No. 223,390, dated January 6, 1880.

Application filed March 28, 1879.

*To all whom it may concern:*

Be it known that I, GEORGE P. RUHLE, of Swengel, in the county of Union and State of Pennsylvania, have invented a new and Improved Combined Scraper and Fork, of which the following is a specification.

My improved device is intended for use as a scraper, hay lifter or fork, and dung-fork; and the invention consists in a novel combination and arrangement of parts, whereby the apparatus may be conveniently used for the purposes named.

In the accompanying drawings, Figure 1 is a top view of the apparatus as adapted for use as a scraper. Fig. 2 is a top view with the scraper-blade removed, whereby the apparatus becomes a fork. Fig. 3 is a vertical section on line $x\,x$ of Fig. 1. Fig. 4 is a side view, showing the scraper in position for dumping its load.

Similar letters of reference indicate corresponding parts.

The apparatus is intended to be drawn by horse-power.

The head A has affixed rigidly to it the tangs $a$. $b\,b$ are the handles attached upon A. $c$ is a tongue hinged to A, and extending forward for the attachment of the team. The tongue $c$ is braced laterally by the side braces, $d$, and is held rigidly by the toggle-bar $e$, that is connected to $c$ and to a slotted bar, $f$, which extends backward from head A. The toggle-bar $e$ is attached to $f$ in a manner permitting adjustment of length.

$g$ is a lever pivoted in the rear arm of the toggle $e$, contiguous to the joint, and is used for raising the toggle-joint upward, and thereby permitting the tongue $c$ to swing up and back.

As described and shown in Fig. 2, the apparatus is adapted for use as a hay-fork or for drawing dung.

The scraper consists of a metal blade or scoop, B, of size and form for lying upon and covering the tangs $a$. This blade B is provided with loops $h$, fitting over staples $i$ on head A, for retaining the blade in place, and at the under side of B are sockets $k$, into which the points of the tangs enter, whereby the blade will be rigidly held. The blade B is formed with raised sides $l\,l$ to retain the dirt. In this form the apparatus is a scraper, and the change is readily made from a fork to a scraper, or vice versa.

The manner of dumping a load is shown by Fig. 4. By pulling upon the cord of lever $g$ the toggle-joint is bent or lifted upward, and the scraper may then turn over to empty itself. When used as a hay fork or lifter the cord from lever $g$ will extend to a convenient place, and the fork will turn by the weight of its load when the toggle-joint is bent. This apparatus is simple and convenient, and the combination will save the expense of two or three different tools, which generally are without use the greater portion of the time.

Having thus fully described my invention, I claim as new and desire to secure by Letters Patent—

A combined scraper and fork consisting of the scraper B and head A, having rigid tangs $a$, slotted bar $f$, and handles $b\,b$, the braced tongue $d\,c$, hinged to said head, the toggle-bar $e$, hinged to the tongue and pivoted to bar $f$, and the lever $g$, pivoted in the rear arm of the toggle near the joint, and lifting the rear end of the front arm of the toggle, as shown and described.

GEORGE P. RUHLE.

Witnesses:
JAMES M. HALFPENNY,
GEORGE W. SHEARY.